United States Patent
Okada et al.

(10) Patent No.: US 11,534,981 B2
(45) Date of Patent: Dec. 27, 2022

(54) FRICTION STIR SPOT WELDING APPARATUS AND FRICTION STIR SPOT WELDING METHOD

(71) Applicant: KAWASAKI JUKOGYO KABUSHIKI KAISHA, Kobe (JP)

(72) Inventors: Hideki Okada, Kobe (JP); Masahiro Miyake, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/368,826

(22) Filed: Jul. 7, 2021

(65) Prior Publication Data

US 2021/0331421 A1 Oct. 28, 2021

Related U.S. Application Data

(63) Continuation of application No. PCT/JP2020/000084, filed on Jan. 6, 2020.

(30) Foreign Application Priority Data

Jan. 7, 2019 (JP) .............................. JP2019-000670

(51) Int. Cl.
*B29C 65/06* (2006.01)
*B23K 20/12* (2006.01)
(Continued)

(52) U.S. Cl.
CPC ........ *B29C 65/0681* (2013.01); *B23K 20/122* (2013.01); *B29C 66/721* (2013.01); *B23K 2103/38* (2018.08); *B29K 2307/04* (2013.01)

(58) Field of Classification Search
CPC ... B29C 65/0681; B29C 66/721; B29C 65/06; B23K 20/122; B23K 2103/38;
(Continued)

(56) References Cited

U.S. PATENT DOCUMENTS 6,722,556 B2 * 4/2004 Schilling .............. B23K 20/125
228/2.1
2017/0129161 A1 5/2017 Ueno et al.
(Continued)

FOREIGN PATENT DOCUMENTS

| JP | 5971273 B2 | 8/2016 |
| JP | 6020501 B2 | 11/2016 |
| JP | WO2017047574 A1 * | 3/2017 |

OTHER PUBLICATIONS

WO2017047574A1 Machine Translation of Description (Year: 2022).*

*Primary Examiner* — Cynthia L Schaller
(74) *Attorney, Agent, or Firm* — Xsensus LLP

(57) ABSTRACT

A friction stir spot welding apparatus including a controller that (A) operates a rotary driver and a tool driver such that a pin and a shoulder are brought into contact with a welded workpiece; (B) operates, after the step (A), the rotary driver and the tool driver such that the pin separates from the welded workpiece; and (C) operates, after the step (B), the rotary driver and the tool driver such that the pin advances toward the welded workpiece. The controller controls the tool driver such that pressing force applied to the welded workpiece from the pin and the shoulder in the step (C) is smaller than that in the step (B) and/or controls the rotary driver such that rotational frequencies of the pin and the shoulder in the step (C) are lower than those in the step (B).

6 Claims, 10 Drawing Sheets

(51) Int. Cl.
*B23K 103/00* (2006.01)
*B29K 307/04* (2006.01)
*B29C 65/00* (2006.01)

(58) Field of Classification Search
CPC .......... B23K 2103/166; B23K 2103/18; B23K 20/1245; B23K 20/1265; B23K 20/125; B23K 20/123; B23K 20/22; B29K 2307/04
See application file for complete search history.

(56) References Cited

U.S. PATENT DOCUMENTS

2017/0136686 A1   5/2017  Ueno et al.
2017/0304935 A1*  10/2017  Okada .................... B23K 20/12

* cited by examiner

FRICTION STIR SPOT WELDING APPARATUS AND FRICTION STIR SPOT WELDING METHOD

CROSS REFERENCE TO RELATED APPLICATIONS

The present application is a bypass continuation of PCT Application No. PCT/JP2020/000084 filed on Jan. 6, 2020, which claims priority to JP 2019-000670 filed Jan. 7, 2019, the entire contents of each are incorporated herein by its reference.

TECHNICAL FIELD

The present disclosure relates to a friction stir spot welding apparatus and a friction stir spot welding method.

BACKGROUND ART

Known is a welding method of welding a metal workpiece and a resin workpiece made of a composite material, such as fiber reinforced plastic, or welding resin workpieces to each other (for example, see PTL 1). Moreover, a welding method of welding resin workpieces to each other is known (for example, see PTL 2).

The welding method disclosed in PTL 1 includes: an introducing step of softening or melting resin of a second workpiece arranged at an upper side of a first workpiece including a hole that opens on one of surfaces of the first workpiece and pushing and introducing a fiber-reinforced resin workpiece into the hole, the fiber-reinforced resin workpiece being prepared by mixing a fiber material in the softened or molten resin; and a curing step of curing the introduced resin.

Moreover, the welding method disclosed in PTL 2 includes: a push-in step of, while rotating a pin and a shoulder, moving the shoulder in a direction toward a contact surface between a first workpiece and a second workpiece and moving the pin in a direction away from the contact surface; a step of stopping the rotation of the pin and the rotation of the shoulder and pulling out the pin and the shoulder from a welding formation portion by moving the pin in a direction toward the contact surface while moving the shoulder in a direction away from the contact surface; and a step of curing resin contained in the welding formation portion.

CITATION LIST

Patent Literature

PTL 1: Japanese Patent No. 5971273
PTL 2: Japanese Patent No. 6020501

SUMMARY

A friction stir spot welding apparatus according to the present disclosure is a friction stir spot welding apparatus that partially stirs a welded workpiece including a first workpiece and a second workpiece to weld the first workpiece and the second workpiece to each other, the first workpiece including fiber reinforced plastic, the friction stir spot welding apparatus comprising: a pin that is cylindrical or columnar, rotates about an axis, and advances or retreats in a direction along the axis; a shoulder that is cylindrical, rotates about the axis, and advances or retreats in the direction along the axis, the pin being within the shoulder; a rotary driver to rotate the pin and the shoulder about the axis; a tool driver to advance and retreat the pin and the shoulder along the axis; and circuitry configured to: (A) operate the rotary driver and the tool driver such that the pin and the shoulder are brought into contact with the welded workpiece while rotating about the axis, (B) operate, after the (A), the rotary driver and the tool driver such that the pin moves in a direction away from the welded workpiece while the pin and the shoulder rotate about the axis, or such that the shoulder is further pressed in the welded workpiece while the pin and the shoulder rotate about the axis, and (C) operate, after the (B), the rotary driver and the tool driver such that the pin advances toward the welded workpiece while the pin and the shoulder rotate about the axis, or such that the shoulder moves in the direction away from the welded workpiece while the pin and the shoulder rotate about the axis, wherein the circuitry is configured to control the tool driver such that pressing force applied to the welded workpiece from the pin and the shoulder in the (C) is smaller than that in the (B) and/or controls the rotary driver such that rotational frequencies of the pin and the shoulder in the (C) are lower than those in the (B).

Moreover, a friction stir spot welding method according to the present disclosure is a method of operating a friction stir spot welding apparatus that partially stirs a welded workpiece including a first workpiece and a second workpiece to weld the first workpiece and the second workpiece to each other, the first workpiece including fiber reinforced plastic, the friction stir spot welding apparatus comprising: a pin that is cylindrical or columnar, rotates about an axis, and advances or retreats in a direction along the axis; a shoulder that is cylindrical, rotates about the axis, and advances or retreats in the direction along the axis, the pin being within the shoulder; a rotary driver to rotate the pin and the shoulder about the axis; and a tool driver to advance and retreat the pin and the shoulder along the axis, the method comprising: (A) operating the rotary driver and the tool driver such that the pin and the shoulder are brought into contact with the welded workpiece while rotating about the axis; (B) operating, after the (A), the rotary driver and the tool driver such that the pin moves in a direction away from the welded workpiece while the pin and the shoulder rotate about the axis, or such that the shoulder is further pressed in the welded workpiece while the pin and the shoulder rotate about the axis; and (C) operating, after the (B), the rotary driver and the tool driver such that the pin advances toward the welded workpiece while the pin and the shoulder rotate about the axis, or such that the shoulder moves in the direction away from the welded workpiece while the pin and the shoulder rotate about the axis, wherein the tool driver operates such that pressing force applied to the welded workpiece from the pin and the shoulder in the (C) is smaller than that in the (B), and/or the rotary driver operates such that rotational frequencies of the pin and the shoulder in the (C) are lower than those in the (B).

The above object, other objects, features, and advantages of the present disclosure will be made clear by the following detailed explanation of preferred embodiments with reference to the attached drawings.

DESCRIPTION OF EMBODIMENTS

Figure 1:
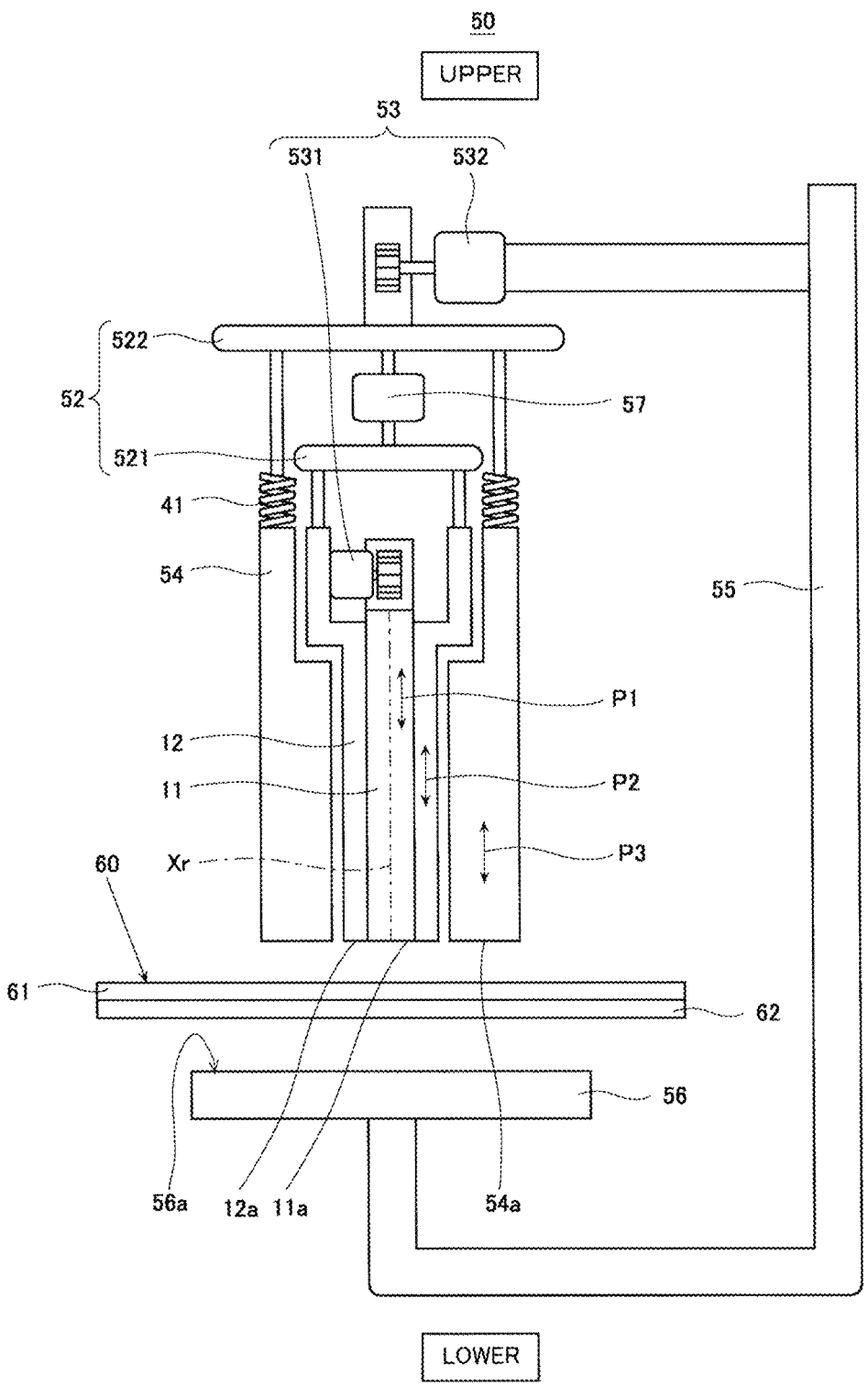
FIG. 1 is a schematic diagram showing a schematic configuration of a friction stir spot welding apparatus according to an exemplary embodiment.

Hereinafter, preferred embodiments of the present disclosure will be described with reference to the drawings. In the following description and the drawings, the same reference signs are used for the same or corresponding components, and the repetition of the same explanation is avoided. Moreover, in the drawings, components necessary to explain the present disclosure are shown, and the other component may be omitted. Furthermore, the present disclosure is not limited to the following embodiments.

A friction stir spot welding apparatus according to an exemplary embodiment is a friction stir spot welding apparatus that partially stirs a welded workpiece including a first workpiece and a second workpiece to weld the first workpiece and the second workpiece to each other, the friction stir spot welding apparatus including: a pin that is columnar, rotates about an axis, and advances or retreats in a direction along the axis; a shoulder that is cylindrical, rotates about the axis, and advances or retreats in the direction along the axis, the pin being inserted into the shoulder; a rotary driver that makes the pin and the shoulder rotate about the axis; a tool driver that makes the pin and the shoulder advance or retreat along the axis; and a controller. The first workpiece is made of fiber reinforced plastic and is arranged so as to be opposed to the pin and the shoulder. The controller (A) operates the rotary driver and the tool driver such that the pin and the shoulder are brought into contact with the welded workpiece while rotating about the axis, (B) operates, after the (A), the rotary driver and the tool driver such that the pin moves in a direction away from the welded workpiece while the pin and the shoulder rotate about the axis, or such that the shoulder is further pressed in the welded workpiece while the pin and the shoulder rotate about the axis, (C) operates, after the (B), the rotary driver and the tool driver such that the pin advances toward the welded workpiece while the pin and the shoulder rotate about the axis, or such that the shoulder moves in the direction away from the welded workpiece while the pin and the shoulder rotate about the axis, and (D) operates, after the (C), the rotary driver and the tool driver such that a tip end surface of the pin and a tip end surface of the shoulder are located on a front surface of the welded workpiece while the pin and the shoulder rotate about the axis. The controller controls the tool driver such that pressing force applied to the welded workpiece from the pin and the shoulder in the (C) is smaller than that in the (B) and/or controls the rotary driver such that rotational frequencies of the pin and the shoulder in the (C) are lower than those in the (B).

Moreover, in the friction stir spot welding apparatus according to an exemplary embodiment, the controller may control the rotary driver such that the rotational frequencies of the pin and the shoulder in the (D) are lower than those in the (B).

Moreover, in the friction stir spot welding apparatus according to an exemplary embodiment, the controller may control the tool driver such that the pressing force applied to the welded workpiece from the pin and the shoulder in the (D) is larger than that in the (C).

Furthermore, in the friction stir spot welding apparatus according to an exemplary embodiment, the second workpiece may be made of fiber reinforced plastic.

Hereinafter, one example of the friction stir spot welding apparatus according to an exemplary embodiment will be described in detail with reference to the drawings.

Configuration of Friction Stir Spot Welding Apparatus

FIG. 1 is a schematic diagram showing a schematic configuration of the friction stir spot welding apparatus according to an exemplary embodiment. An upper-lower direction in FIG. 1 corresponds to an upper-lower direction of the friction stir spot welding apparatus.

As shown in FIG. 1, a friction stir spot welding apparatus 50 according to an exemplary embodiment includes a pin 11, a shoulder 12, a tool fixture 52, a tool driver 53, a clamp structure 54, a backing support 55, a backing structure 56, and a rotary driver 57.

The pin 11 and the shoulder 12 are supported by the tool fixture 52 and are driven by the tool driver 53 to advance or retreat in the upper-lower direction. The pin 11, the shoulder 12, the tool fixture 52, the tool driver 53, and the clamp structure 54 are disposed at an upper portion of the backing support 55 constituted by a C-shaped gun (C-shaped frame). Moreover, the backing structure 56 is disposed at a lower portion of the backing support 55. The pin 11, the shoulder 12, and the backing structure 56 are attached to the backing support 55 at such positions that the pin 11 and the shoulder 12 are opposed to the backing structure 56. A welded workpiece 60 is arranged between the pin 11 and the backing structure 56 and between the shoulder 12 and the backing structure 56.

The tool fixture 52 is constituted by a rotary tool fixture 521 and a clamp fixture 522. The tool driver 53 is constituted by a pin driver 531, a shoulder driver 532, and a clamp driver 41. Moreover, the clamp structure 54 is fixed to the clamp fixture 522 through the clamp driver 41. The clamp driver 41 is constituted by springs.

The pin 11 is formed in a substantially cylindrical shape or a substantially columnar shape. Although not shown in FIG. 1 in detail, the pin 11 is supported by the rotary tool fixture 521. Moreover, the pin 11 is rotated by the rotary driver 57 about an axis Xr (rotation axis) that coincides with a center axis of the pin 11. Furthermore, the pin 11 can advance or retreat by the pin driver 531 in a direction indicated by an arrow P1, i.e., in a direction along the axis Xr (in the upper-lower direction in FIG. 1).

The pin driver 531 may be constituted by, for example, a linear motion actuator. The linear motion actuator may be constituted by a servomotor and a rack-and-pinion or by a servomotor and a ball screw.

The shoulder 12 is formed in a substantially cylindrical shape including a hollow and is supported by the rotary tool fixture 521. The pin 11 is inserted into the hollow of the shoulder 12. In other words, the shoulder 12 is arranged so as to surround an outer peripheral surface of the pin 11. Moreover, the shoulder 12 is rotated by the rotary driver 57 about the axis Xr as with the pin 11. Furthermore, the shoulder 12 can advance or retreat by the shoulder driver 532 in a direction indicated by an arrow P2, i.e., in the direction along the axis Xr.

As above, in the present embodiment, both the pin 11 and the shoulder 12 are supported by the rotary tool fixture 521 and are integrally rotated by the rotary driver 57 about the axis Xr. Moreover, the pin 11 can advance or retreat by the pin driver 531 in the direction along the axis Xr, and the shoulder 12 can advance or retreat by the shoulder driver 532 in the direction along the axis Xr.

In an exemplary embodiment, the pin 11 can independently advance or retreat, and in addition, can advance or retreat in accordance with the advancing or retreating of the shoulder 12. However, the pin 11 and the shoulder 12 may individually advance or retreat.

As with the shoulder 12, the clamp structure 54 is formed in a cylindrical shape including a hollow. The clamp structure 54 is disposed such that a center axis of the clamp structure 54 coincides with the axis Xr. The shoulder 12 is inserted into the hollow of the clamp structure 54.

To be specific, the substantially cylindrical shoulder 12 is arranged so as to surround the outer peripheral surface of the pin 11, and the substantially cylindrical clamp structure 54 is arranged so as to surround an outer peripheral surface of the shoulder 12. In other words, the clamp structure 54, the shoulder 12, and the pin 11 constitute a coaxial nested structure.

Moreover, the clamp structure 54 presses one surface (front surface) of the welded workpiece 60. As described above, in an exemplary embodiment, the clamp structure 54 is supported by the clamp fixture 522 through the clamp driver 41. The clamp driver 41 biases the clamp structure 54 toward the backing structure 56.

In an exemplary embodiment, the clamp driver 41 is constituted by the springs but is not limited to these. The clamp driver 41 may apply biasing force or pressure to the clamp structure 54. For example, a mechanism that utilizes gas pressure, hydraulic pressure, a servomotor, or the like may be suitably used.

The rotary tool fixture 521 is supported by the clamp fixture 522 through the rotary driver 57. Then, the clamp structure 54 (and the clamp driver 41 and the clamp fixture 522) can advance or retreat by the shoulder driver 532 in a direction indicated by an arrow P3 (which is the same as the direction indicated by the arrow P1 and the direction indicated by the arrow P2).

To be specific, in an exemplary embodiment, the clamp driver 41 and the shoulder driver 532 constitute a clamp structure driver. The clamp structure driver may be constituted by a driver that makes the clamp structure 54 advance or retreat independently from the shoulder driver 532.

The shoulder driver 532 may be constituted by, for example, a linear motion actuator. The linear motion actuator may be constituted by a servomotor and a rack-and-pinion or by a servomotor and a ball screw.

The pin 11, the shoulder 12, and the clamp structure 54 respectively include a tip end surface 11a, a tip end surface 12a, and a tip end surface 54a. Moreover, the pin 11, the shoulder 12, and the clamp structure 54 advance or retreat by the tool driver 53 to bring the tip end surfaces 11a, 12a, and 54a into contact with the front surface of the welded workpiece 60.

In an exemplary embodiment, the backing structure 56 supports the welded workpiece 60 having a flat plate shape such that a flat surface (supporting surface 56a) of the backing structure 56 contacts a back surface of the welded workpiece 60. The configuration of the backing structure 56 is not especially limited as long as the backing structure 56 can appropriately support the welded workpiece 60 such that the friction stir spot welding can be performed. For example, the backing structures 56 of various shapes may be additionally prepared, and the backing structure 56 may be detachable from the backing support 55 and replaceable in accordance with the types of the welded workpieces 60.

Specific configurations of the pin 11, the shoulder 12, the tool fixture 52, the tool driver 53, the clamp structure 54, the backing support 55, and the rotary driver 57 in an exemplary embodiment are not limited to the above-described configurations, and configurations widely known in the field of the friction stir welding may be suitably used. For example, in the present embodiment, each of the pin driver 531 and the shoulder driver 532 constituting the tool driver 53 is constituted by a motor, a gear mechanism, and the like known in the field of the friction stir welding but is not limited to these.

Moreover, in an exemplary embodiment, the clamp structure 54 is adopted. However, the present embodiment is not limited to this, and the clamp structure 54 may not be adopted. In this case, for example, the clamp structure 54 may be detachable from the backing support 55 according to need.

Moreover, in an exemplary embodiment, the backing support 55 is constituted by the C-shaped gun but is not limited to this. The backing support 55 may have any configuration as long as: the backing support 55 can support the pin 11 and the shoulder 12 such that the pin 11 and the shoulder 12 can advance or retreat; and the backing support 55 can support the backing structure 56 at a position opposed to the pin 11 and the shoulder 12.

Furthermore, the friction stir spot welding apparatus 50 according to an exemplary embodiment is disposed at a friction stir spot welding robot system (not shown). Specifically, the backing support 55 is attached to a tip end of an arm of the robot system. Therefore, the backing support 55 can be regarded as being included in the friction stir spot welding robot system. A specific configuration of the friction stir spot welding robot system including the backing support 55 and the arm is not especially limited, and apparatuses, such as an articulated robot, known in the field of the friction stir welding can be suitably used.

The present embodiment is not limited to a case where the friction stir spot welding apparatus 50 (including the backing support 55) is applied to the friction stir spot welding robot system. The friction stir spot welding apparatus 50 (including the backing support 55) is suitably applicable to known processing apparatuses, such as NC machining apparatuses, large C-shaped frames, and automatic riveters.

Moreover, the friction stir spot welding apparatus 50 according to an exemplary embodiment may be configured such that two or more robots make the backing structure 56 and portions of the friction stir spot welding apparatus 50 other then the backing structure 56 face each other. Furthermore, as long as the friction stir spot welding apparatus 50 can stably perform the friction stir spot welding with respect to the welded workpiece 60, the welded workpiece 60 may be of a handy type, or a robot may be used as a positioner for the welded workpiece 60.

Control Configuration of Friction Stir Spot Welding Apparatus

Next, a control configuration of the friction stir spot welding apparatus 50 according to an exemplary embodiment will be specifically described with reference to FIG. 2.

Figure 2:
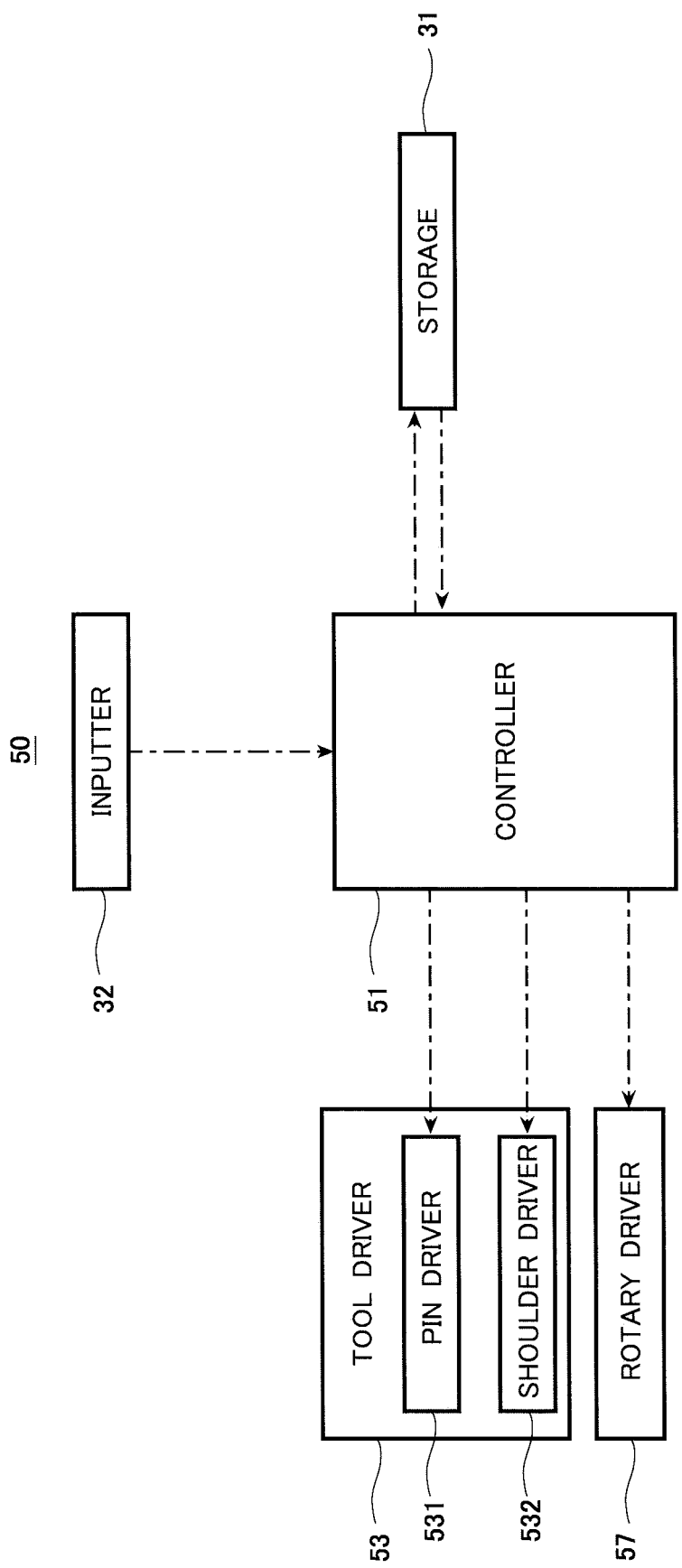
FIG. 2 is a block diagram schematically showing a control configuration of the friction stir spot welding apparatus shown in FIG. 1.

FIG. 2 is a block diagram schematically showing the control configuration of the friction stir spot welding apparatus shown in FIG. 1.

As shown in FIG. 2, the friction stir spot welding apparatus 50 includes a controller 51, a storage 31, and an inputter 32.

The controller 51 controls respective structures (respective devices) constituting the friction stir spot welding apparatus 50. Specifically, the controller 51 reads and executes software, such as a basic program, stored in the storage to control the pin driver 531 and shoulder driver 532 of the tool driver 53 and the rotary driver 57.

With this, switching between advancing and retreating of the pin 11 and the shoulder 12, control of the positions of a tip end of the pin 11 and a tip end of the shoulder 12 during advancing or retreating, movement speeds of the pin 11 and the shoulder 12, movement directions of the pin 11 and the shoulder 12, and the like can be controlled. Moreover, pressing forces applied to the welded workpiece 60 from the pin 11, the shoulder 12, and the clamp structure 54 can be controlled. Furthermore, rotational frequencies of the pin 11 and the shoulder 12 can be controlled.

The controller 51 may be constituted by a single controller 51 which performs centralized control or may be constituted by controllers 51 which cooperate to perform distributed control. Moreover, the controller 51 may be constituted by a microcomputer or may be constituted by an MPU, a PLC (Programmable Logic Controller), a logic circuit, or the like.

The storage 31 stores a basic program and various data and is constituted by a known memory, a storage apparatus such as a hard disk, or the like. The storage 31 does not have to be a single storage and may be constituted as storage apparatuses (for example, a random access memory and a hard disc drive). When the controller 51 and the like are constituted by a microcomputer, at least part of the storage 31 may be constituted as an internal memory of the microcomputer or may be constituted as an independent memory.

Needless to say, the storage 31 stores data, and the data may be read by a device other than the controller 51, and the controller 51 and the like may write data in the storage 31.

The inputter 32 inputs, to the controller 51, various parameters regarding the control of the friction stir spot welding, other data, and the like. The inputter 32 is constituted by a known input device, such as a keyboard, a touch panel, or a button switch group. In an exemplary embodiment, at least data of welding conditions of the welded workpiece 60, such as the thickness, material, and the like of the welded workpiece 60, can be input by the inputter 32.

Friction Stir Spot Welding Method (Operation of Friction Stir Spot Welding Apparatus)

Next, specific steps of the friction stir spot welding method performed by using the friction stir spot welding apparatus 50 will be specifically described with reference to FIGS. 3, 4A, and 4B.

The following will describe one example in which the controller 51 controls the tool driver 53 so as to reduce an absolute value of a tool average position Tx defined by Formula (I) below, where Ap denotes an area of the tip end surface of the pin 11, As denotes an area of the tip end surface of the shoulder 12, Pp denotes a press-in depth of the pin 11, and Ps denotes a press-in depth of the shoulder 12.

$$Ap \cdot Pp + As \cdot Ps = Tx \tag{I}$$

Figure 3:
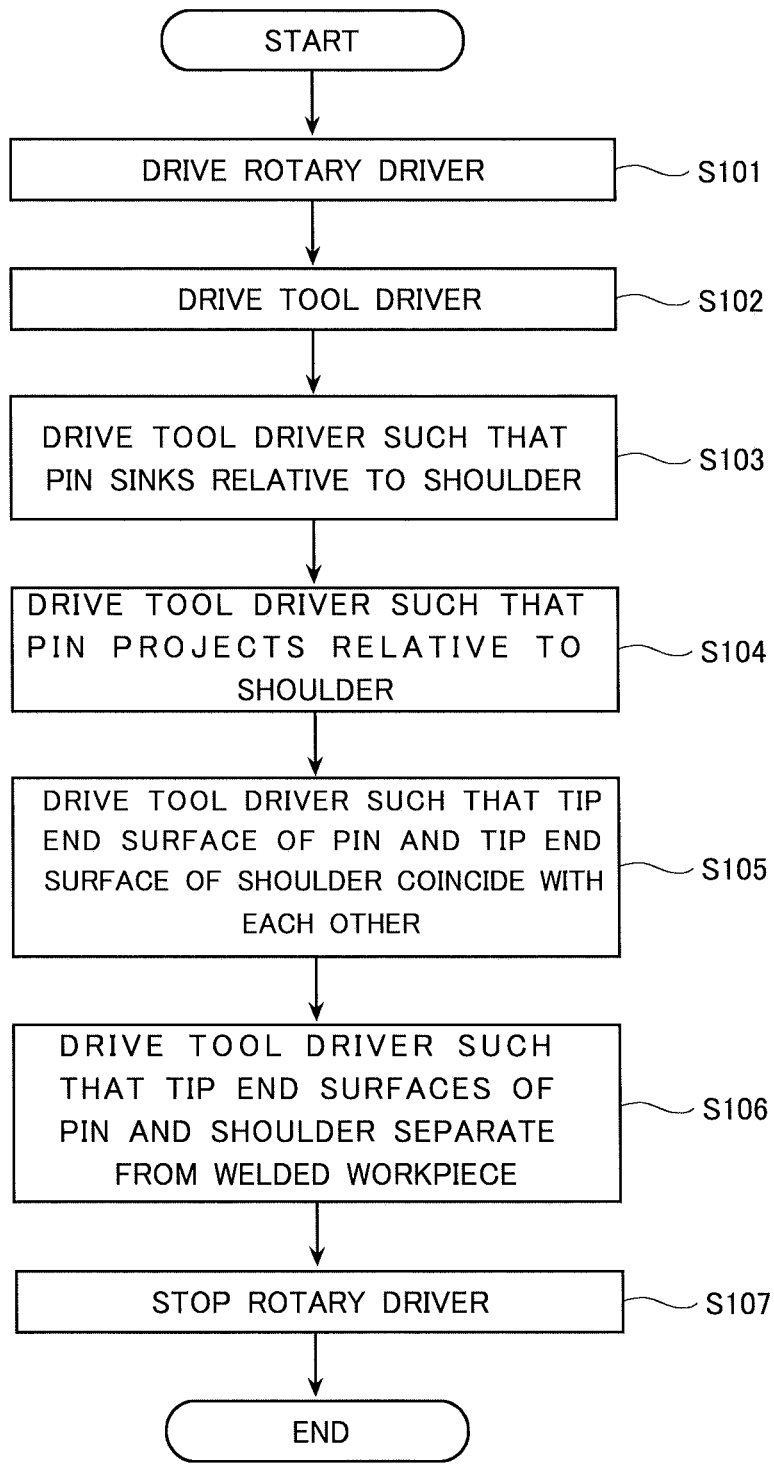
FIG. 3 is a flow chart showing one example of an operation of the friction stir spot welding apparatus according to an exemplary embodiment.

FIG. 3 is a flow chart showing one example of the operation of the friction stir spot welding apparatus according to an exemplary embodiment. FIGS. 4A and 4B are process diagrams schematically showing one example of respective steps of the friction stir spot welding performed by the friction stir spot welding apparatus shown in FIG. 1.

Figure 4A:
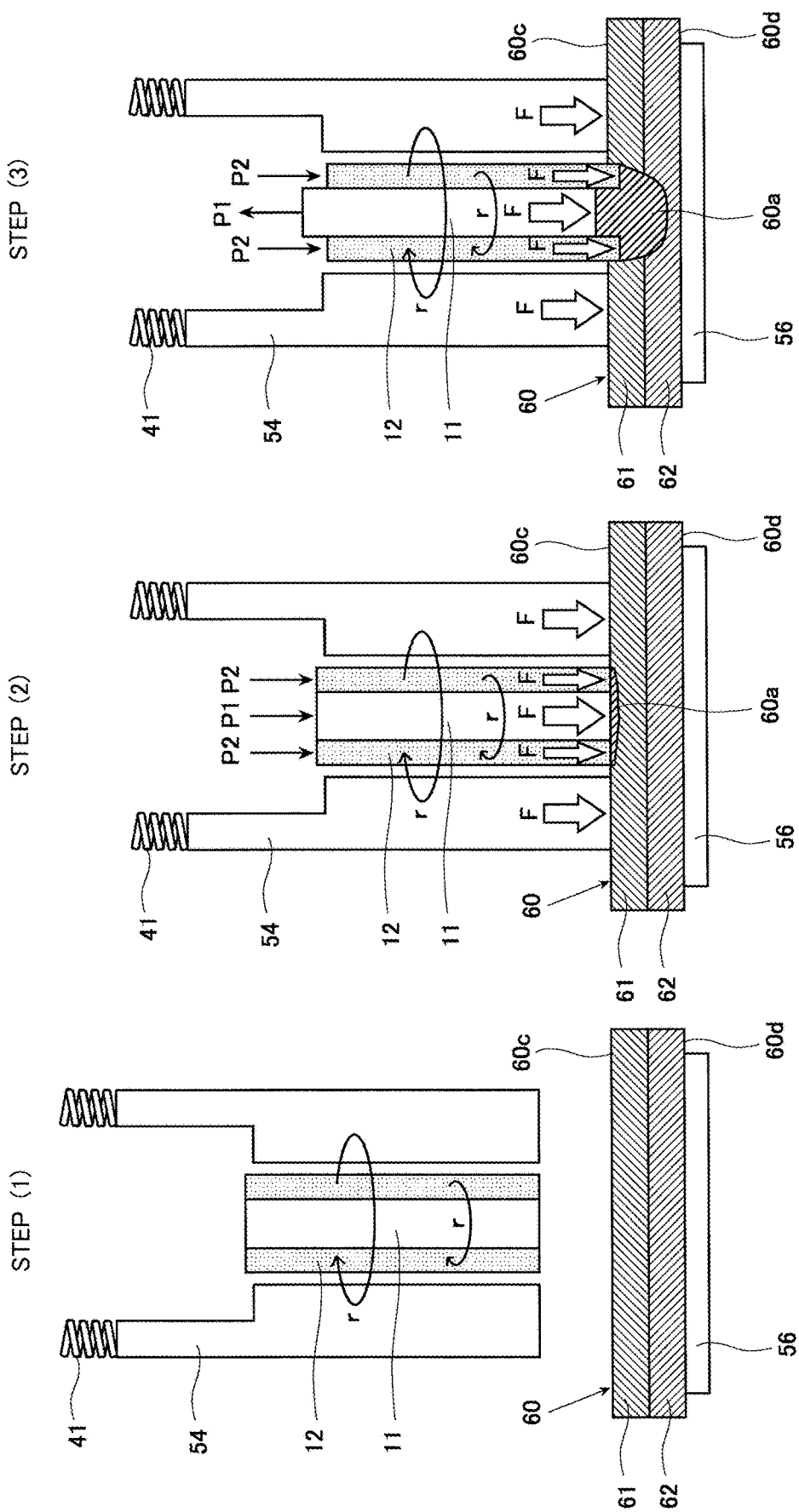
FIG. 4A is a process diagram schematically showing one example of steps of friction stir spot welding performed by the friction stir spot welding apparatus shown in FIG. 1.
Figure 4B:
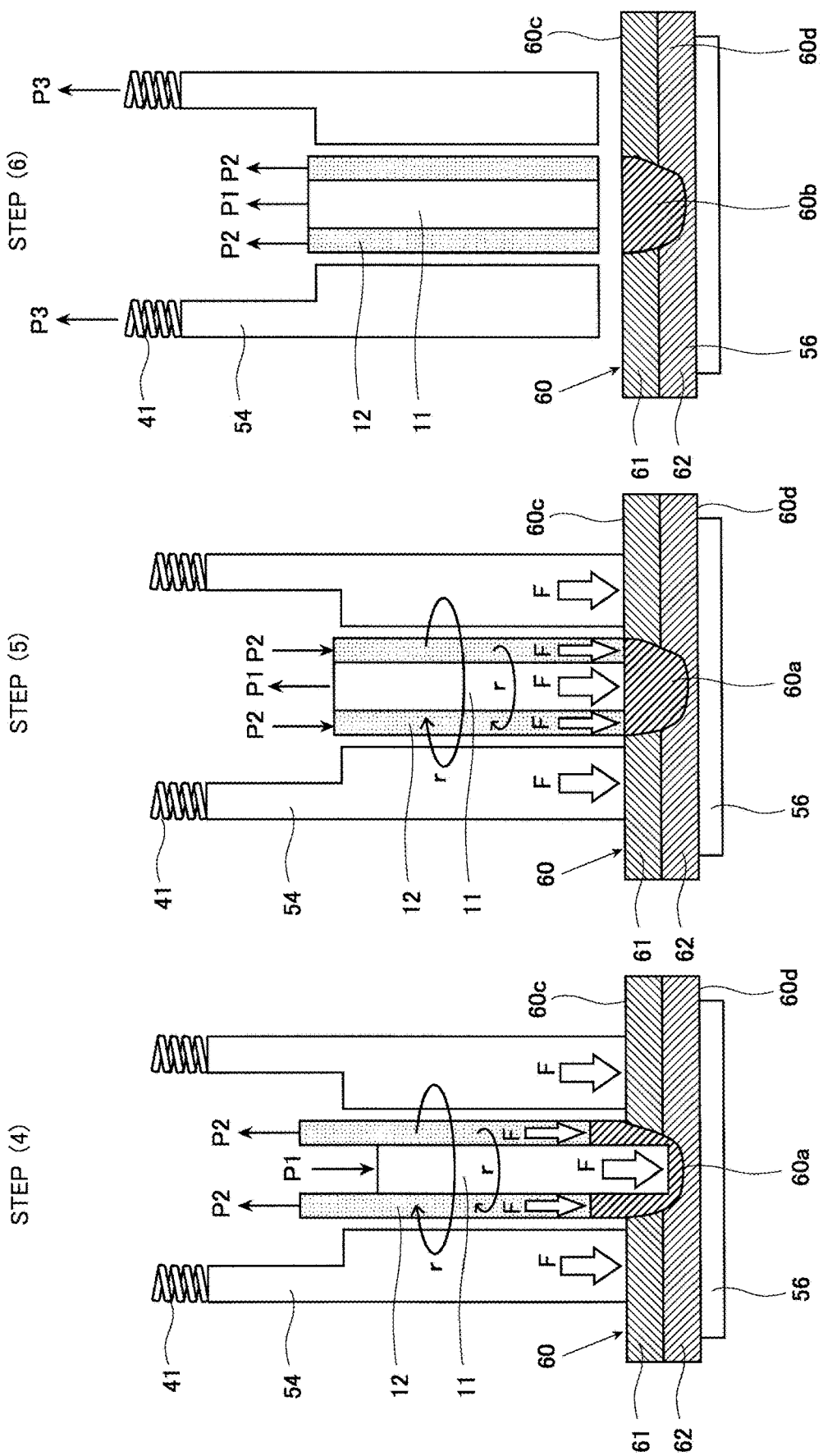
FIG. 4B is a process diagram schematically showing one example of steps of the friction stir spot welding performed by the friction stir spot welding apparatus shown in FIG. 1.

FIGS. 4A and 4B show an example in which a plate-shaped first workpiece 61 and a plate-shaped second workpiece 62 are used as the welded workpiece 60, and these workpieces 61 and 62 are laminated on each other and coupled to each other by spot welding. The first workpiece 61 and the second workpiece 62 may be made of fiber reinforced plastic (for example, carbon fiber reinforced plastic).

Moreover, in an exemplary embodiment, the welded workpiece 60 is constituted by the plate-shaped first workpiece 61 and the plate-shaped second workpiece 62. However, the present embodiment is not limited to this, and the welded workpiece 60 (the first workpiece 61 and the second workpiece 62) may have any shape, and for example, may have a rectangular solid shape or a circular-arc shape.

Moreover, in FIGS. 4A and 4B, part of the double-acting friction welding apparatus is not shown. Arrows r indicate the rotational directions of the pin 11 and the shoulder 12, and block arrows F indicate directions of forces applied by the first workpiece 61 and the second workpiece 62.

Although forces are applied to the first workpiece 61 and the second workpiece 62 from the backing structure 56, such forces are not shown in FIGS. 4A and 4B for convenience of explanation. The shoulder 12 is shown by cross hatching to clearly distinguish between the pin 11 and the clamp structure 54.

First, a worker (operator) places the welded workpiece 60 on the supporting surface 56a of the backing structure 56. Next, the worker manipulates the inputter 32 to input execution of welding of the welded workpiece 60 to the controller 51. A robot may place the welded workpiece 60 on the supporting surface 56a of the backing structure 56.

Then, as shown in FIG. 3, the controller 51 drives the rotary driver 57 to rotate the pin 11 and the shoulder 12 at a preset and predetermined first rotational frequency (for example, 200 to 3,000 rpm) (Step S101; see Step (1) in FIG. 4A). Next, while driving the tool driver 53 (shoulder driver 532) to rotate the pin 11 and the shoulder 12, the controller 51 makes the pin 11, the shoulder 12, and the clamp structure 54 approach the welded workpiece 60 and brings the tip end surface 11a of the pin 11, the tip end surface 12a of the shoulder 12, and the tip end surface 54a of the clamp structure 54 (not shown in FIGS. 4A and 4B) into contact with the front surface 60c of the welded workpiece 60 (Step S102; see Step (2) in FIG. 4A).

At this time, the controller 51 controls the tool driver 53 (shoulder driver 532) such that the pin 11, the shoulder 12, and the clamp structure 54 press the welded workpiece 60 by a preset and predetermined first pressing force (for example, a predetermined value within a range of 3 kN to 10 kN).

With this, the first workpiece 61 and the second workpiece 62 are sandwiched by the clamp structure 54 and the backing structure 56, and the clamp structure 54 is biased toward the front surface 60c of the welded workpiece 60 by the contraction of the clamp driver 41 to generate clamping force.

Moreover, in this state, since the pin 11 and the shoulder 12 do not advance or retreat, the front surface 60c of the welded workpiece 60 is subjected to "preheating." With this, a constituent material at a contact region of the first workpiece 61 is softened by heat generated by friction, and thus, a plastically flowing portion 60a is generated in the vicinity of the front surface 60c of the welded workpiece 60.

Next, the controller 51 drives the tool driver 53 such that the tip end surface 11a of the pin 11 sinks relative to the tip end surface 12a of the shoulder 12 (Step S103). At this time, the controller 51 may drive the tool driver 53 (pin driver 531) such that the pin 11 separates from the welded workpiece 60. Moreover, the controller 51 may drive the tool driver 53 (pin driver 531) such that the shoulder 12 is pressed in the welded workpiece 60.

Moreover, the controller 51 controls the pin driver 531 such that a tip end portion of the shoulder 12 reaches a preset and predetermined first position. Positional information of the tip end portion of the shoulder 12 is detected by a position detector (not shown) and output to the controller 51. A LVDT, an encoder, or the like may be used as the position detector.

The first position may be set in advance by experiments or the like. When a surface of the first workpiece 61 (the front surface 60c of the welded workpiece 60) is regarded as 0%, and a surface of the second workpiece 62 which surface contacts the supporting surface 56a is regarded as 100%, the first position is set arbitrarily within a range of more than 0% and less than 100%. To improve welding strength, the first position is preferably located close to the surface of the second workpiece 62 which surface contacts the supporting surface 56a. The first position may be 25% or more, 50% or more, 75% or more, 80% or more, 90% or more, or 95% or more.

With this, a softened part of the welded workpiece 60 extends from the first workpiece 61 at the upper side to the second workpiece 62 at the lower side, and the volume of the plastically flowing portion 60a increases. Moreover, a softened material of the plastically flowing portion 60a is pushed away by the shoulder 12 to flow from a position right under the shoulder 12 to a position right under the pin 11. Therefore, the pin 11 retreats and moves upward relative to the shoulder 12 (see Step (3) in FIG. 4A).

Next, the controller 51 drives the tool driver 53 (pin driver 531) such that the pin 11 advances toward the welded workpiece 60, or the controller 51 drives the tool driver 53 (shoulder driver 532) such that the shoulder 12 separates from the welded workpiece 60 (Step S104).

With this, the pin 11 gradually advances toward the first workpiece 61, and the shoulder 12 retreats from the first workpiece 61 (see Step (4) in FIG. 4B). At this time, the softened part of the plastically flowing portion 60a flows from the position right under the pin 11 to the position right under the shoulder 12 (to a recess generated by press-in of the shoulder 12).

The controller 51 may control the tool driver 53 such that the tip end surface 11a of the pin 11 is located at the first position. Moreover, the controller 51 may control the tool driver 53 such that the tip end surface 11a of the pin 11 reaches an inside of the second workpiece 62 or may control the tool driver 53 such that the tip end surface 11a of the pin 11 is located inside the first workpiece 61.

Moreover, the controller 51 may control the tool driver 53 such that the tip end surface 11a of the pin 11 and the tip end surface 12a of the shoulder 12 coincide with each other.

Furthermore, the controller 51 may control the tool driver 53 such that the tip end surface 11a of the pin 11 and the tip end surface 12a of the shoulder 12 reach the front surface 60c of the welded workpiece 60.

Moreover, as described above, in an exemplary embodiment, when executing Steps S103 and S104, the controller 51 controls the tool driver 53 so as to reduce the absolute value of the tool average position Tx. Since specific control of reducing the absolute value of the tool average position Tx is disclosed in Japanese Laid-Open Patent Application Publication No. 2012-196682 in detail, an explanation thereof is omitted herein.

Moreover, it is preferable that the controller 51 control the tool driver 53 so as to satisfy a formula "tool average position Tx=0." Herein, the formula "tool average position Tx=0" denotes that the tool average position Tx is ±0 (Tx≈0), i.e., denotes that the tool average position Tx can be regarded as zero based on the units and significant figures of the area Ap of the tip end surface 11a of the pin 11, the area As of the tip end surface 12a of the shoulder 12, the press-in depth Pp of the pin 11, and the press-in depth Ps of the shoulder 12, and other conditions. Therefore, the tool average position Tx does not have to be reduced to zero depending on various conditions, such as the configuration and usage of the friction stir spot welding apparatus 50. The absolute value of the tool average position Tx may be reduced as much as possible from the viewpoint of practical use as long as satisfactory control can be performed.

Furthermore, the controller 51 controls the tool driver 53 such that the pressing force applied to the welded workpiece 60 from the pin 11 and the shoulder 12 in Step S104 is smaller than that in Step S103 and/or controls the rotary driver 57 such that the rotational frequencies of the pin 11 and the shoulder 12 in Step S104 are lower than those in Step S103.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at a welded portion).

Next, the controller 51 controls the tool driver 53 such that the tip end surface 11a of the pin 11 and the tip end surface 12a of the shoulder 12 coincide with each other (Step S105). With this, the front surface 60c of the welded workpiece 60 is shaped, and a substantially flat surface where recesses are not practically generated is obtained (see Step (5) in FIG. 4B).

The controller 51 may control the rotary driver 57 such that the rotational frequencies of the pin 11 and the shoulder 12 in Step S105 are lower than those in Step S103. Moreover, the controller 51 may control the rotary driver 57 such that the rotational frequencies of the pin 11 and the shoulder 12 in Step S105 are lower than those in Step S104.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at the welded portion).

Moreover, the controller 51 may control the tool driver 53 such that the pressing force applied to the welded workpiece 60 from the pin 11 and the shoulder 12 in Step S105 is larger than that in Step S104. With this, voids (void defects) generated in the plastically flowing portion 60a of the welded workpiece 60 can be crushed, and the generation of the void defects in the welded workpiece 60 can be suppressed.

Next, the controller 51 controls the tool driver 53 (shoulder driver 532) such that the pin 11, the shoulder 12, and the clamp structure 54 separate from the welded workpiece 60 (Step S106). Next, the controller 51 controls the rotary driver 57 to stop the rotation of the pin 11 and the shoulder 12 (Step S107) and terminates the friction stir spot welding (step of welding the welded workpiece 60) (see Step (6) in FIG. 4B).

With this, since the rotation (and pressing) of the pin 11 and the shoulder 12 during the contact of the pin 11 and the shoulder 12 with the first workpiece 61 and the second workpiece 62 is not applied to the first workpiece 61 and the second workpiece 62, the plastic flow stops at the plastically flowing portion 60a spreading in both the first workpiece 61 and the second workpiece 62, and the plastically flowing portion 60a becomes a welded portion 60b. With this, the first workpiece 61 and the second workpiece 62 are coupled (welded) to each other by the welded portion 60b.

As above, in the friction stir spot welding apparatus 50 according to an exemplary embodiment, the controller 51 controls the tool driver 53 such that the pressing force applied to the welded workpiece 60 from the pin 11 and the shoulder 12 in Step S104 is smaller than that in Step S103 and/or controls the rotary driver 57 such that the rotational frequencies of the pin 11 and the shoulder 12 in Step S104 are lower than those in Step S103.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at the welded portion).

Moreover, in the friction stir spot welding apparatus 50 according to an exemplary embodiment, the controller 51 may control the rotary driver 57 such that the rotational frequencies of the pin 11 and the shoulder 12 in Step S105 are lower than those in Step S103. Moreover, the controller 51 may control the rotary driver 57 such that the rotational frequencies of the pin 11 and the shoulder 12 in Step S105 are lower than those in Step S104.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at the welded portion).

Moreover, in the friction stir spot welding apparatus 50 according to an exemplary embodiment, the controller 51 may control the tool driver 53 such that the pressing force applied to the welded workpiece 60 from the pin 11 and the shoulder 12 in Step S105 is larger than that in Step S104.

With this, voids (void defects) generated in the plastically flowing portion 60a of the welded workpiece 60 can be crushed, and the generation of the void defects in the welded workpiece 60 can be suppressed.

Furthermore, in the friction stir spot welding apparatus 50 according to an exemplary embodiment, the controller 51 controls the tool driver 53 and the rotary driver 57 so as to reduce the absolute value of the tool average position Tx.

With this, satisfactory welding quality can be realized with a preferable degree of accuracy, and the generation of internal void defects can be prevented or suppressed.

The friction stir spot welding apparatus according to another exemplary embodiment is configured such that in the friction stir spot welding apparatus according to the exemplary embodiment discussed above, the second workpiece is made of metal and includes a hole having an opening portion, and the controller changes a movement speed of the pin in the (C) in accordance with hardness of the fiber reinforced plastic located around a tip end portion of the pin.

Hereinafter, one example of the friction stir spot welding apparatus according to this exemplary embodiment will be described in detail with reference to the drawings.

Configuration of Friction Stir Spot Welding Apparatus

Figure 5:
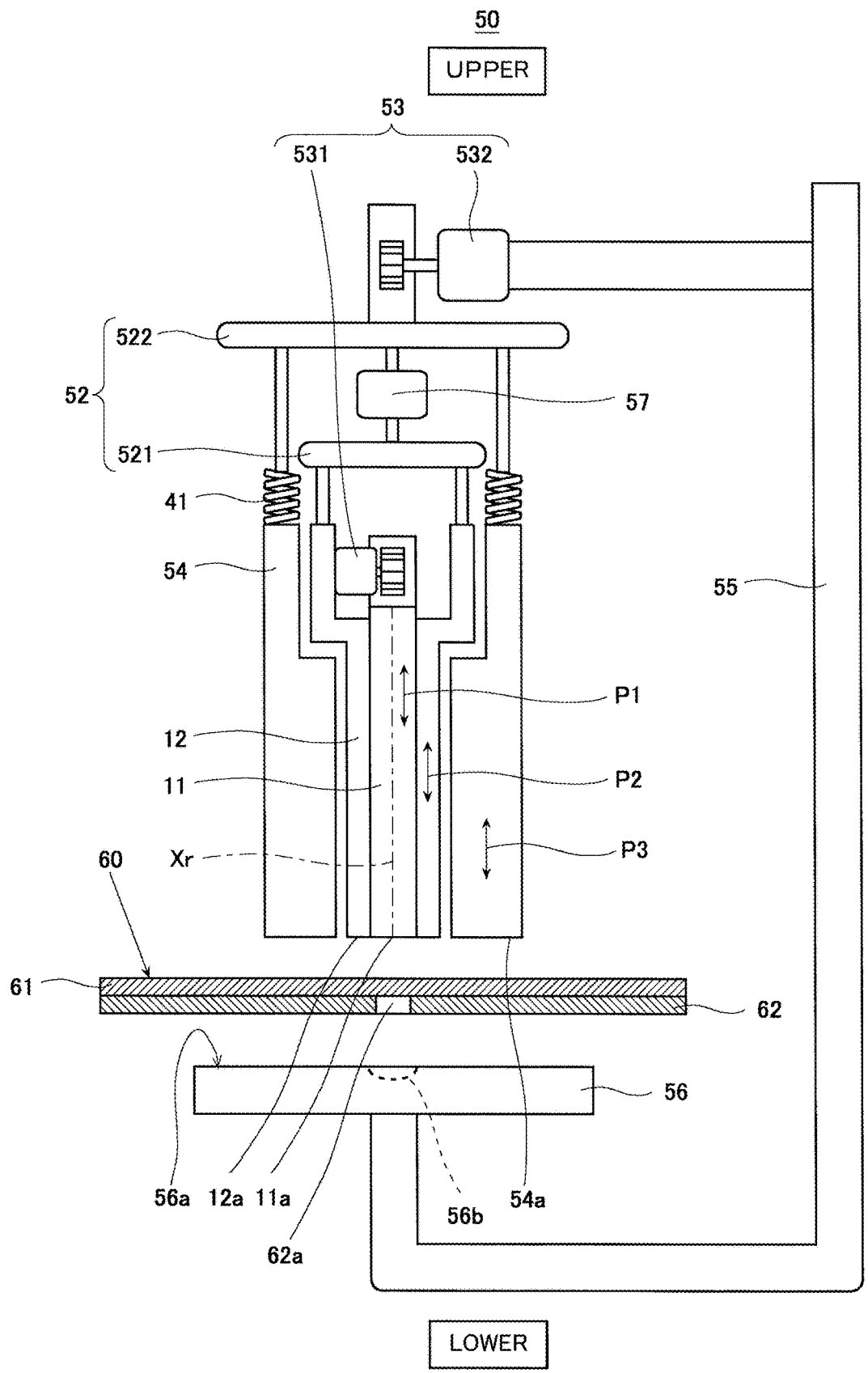
FIG. 5 is a schematic diagram showing a schematic configuration of the friction stir spot welding apparatus according to an exemplary embodiment.

FIG. 5 is a schematic diagram showing a schematic configuration of the friction stir spot welding apparatus according to this exemplary embodiment. An upper-lower direction in FIG. 5 corresponds to an upper-lower direction of the friction stir spot welding apparatus.

As shown in FIG. 5, the friction stir spot welding apparatus 50 according to this exemplary embodiment is the same in basic configuration as the friction stir spot welding apparatus 50 according to the previous exemplary embodiment but is different from the friction stir spot welding apparatus 50 according to the previous exemplary embodiment in that: a recess 56b is disposed at the supporting surface 56a of the backing structure 56; and the second workpiece 62 constituting the welded workpiece 60 is made of metal and includes a hole 62a having an opening portion.

The recess 56b may have any shape as long as an opening area of the opening portion of the recess 56b is larger than an opening area of the hole 62a of the second workpiece 62. In this exemplary embodiment, the recess 56b is formed in a semi-spherical shape. However, the present embodiment is not limited to this, and the recess 56b may be formed in a rectangular solid shape.

Moreover, the opening portion of the hole 62a may be formed in a circular shape or a polygonal shape. The area of the opening portion of the hole 62a can be suitably set depending on welding strength required for the welded workpiece 60.

Operation and Operational Advantage of Friction Stir Spot Welding Apparatus

Next, the operation and operational advantage of the friction stir spot welding apparatus according to this exemplary embodiment will be described with reference to FIGS. 5, 6, 7A, and 7B.

Figure 6:
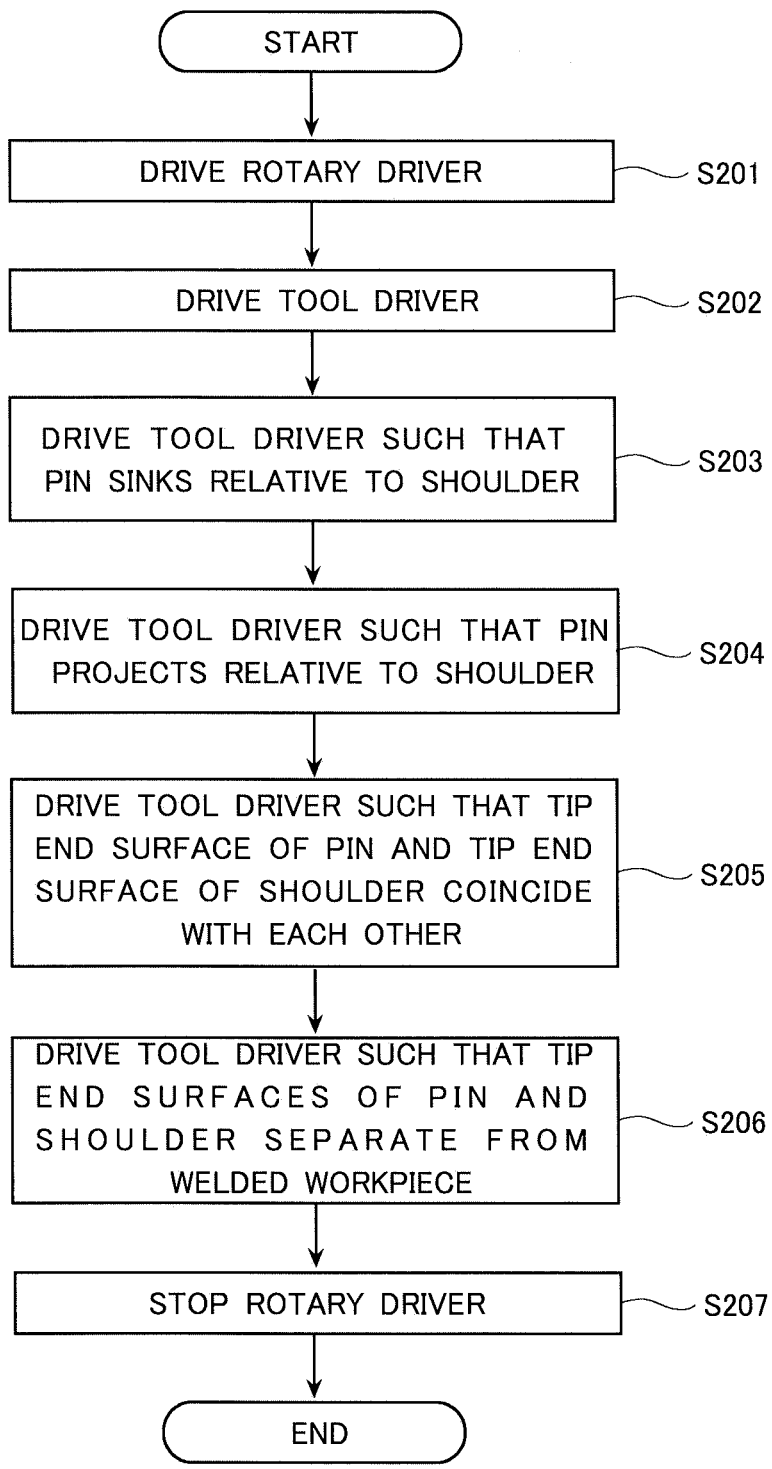
FIG. 6 is a flow chart showing one example of an operation of the friction stir spot welding apparatus according to an exemplary embodiment.
Figure 7A:
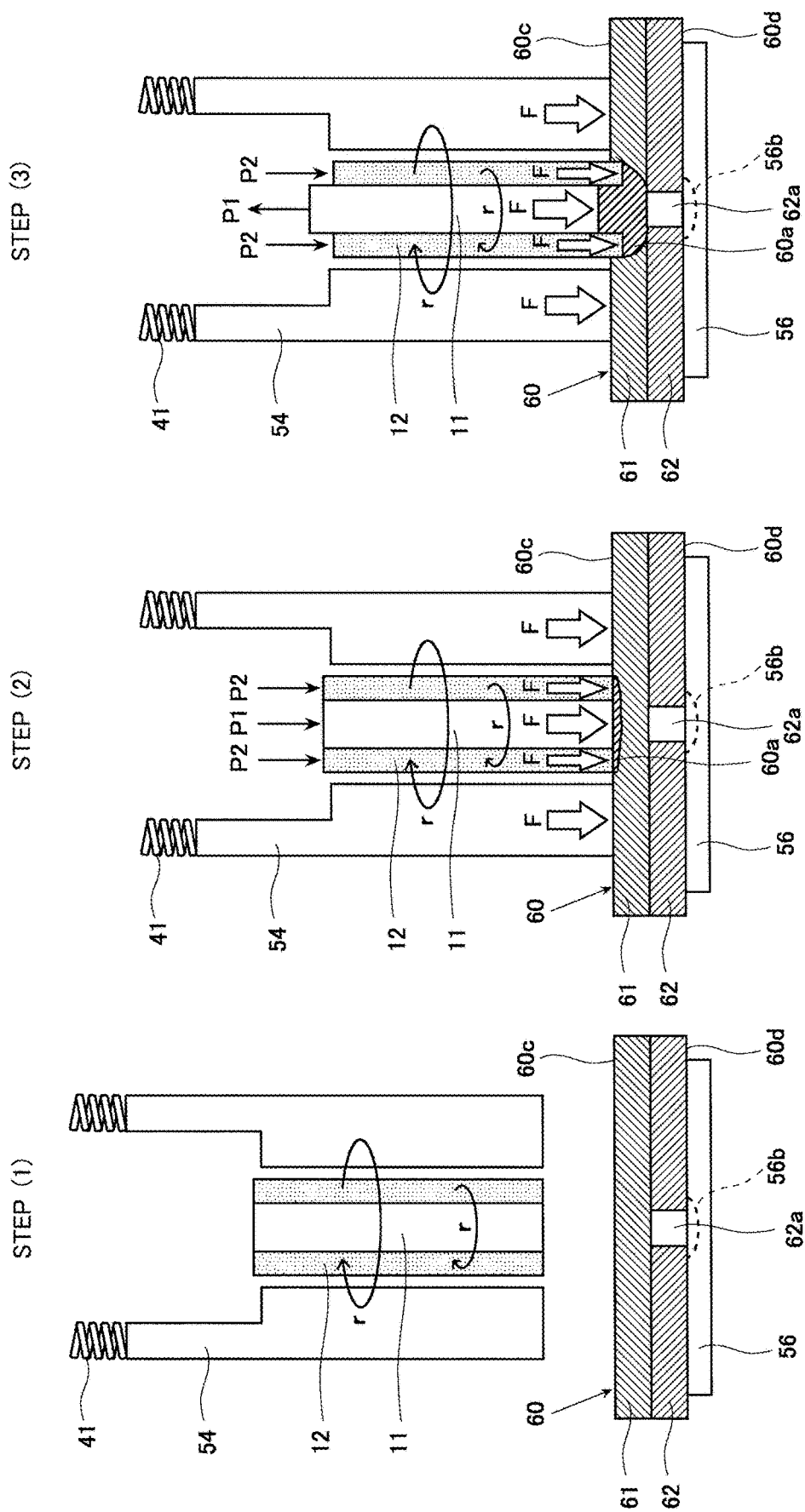
FIG. 7A is a process diagram schematically showing one example of steps of the friction stir spot welding performed by the friction stir spot welding apparatus shown in FIG. 5.
Figure 7B:
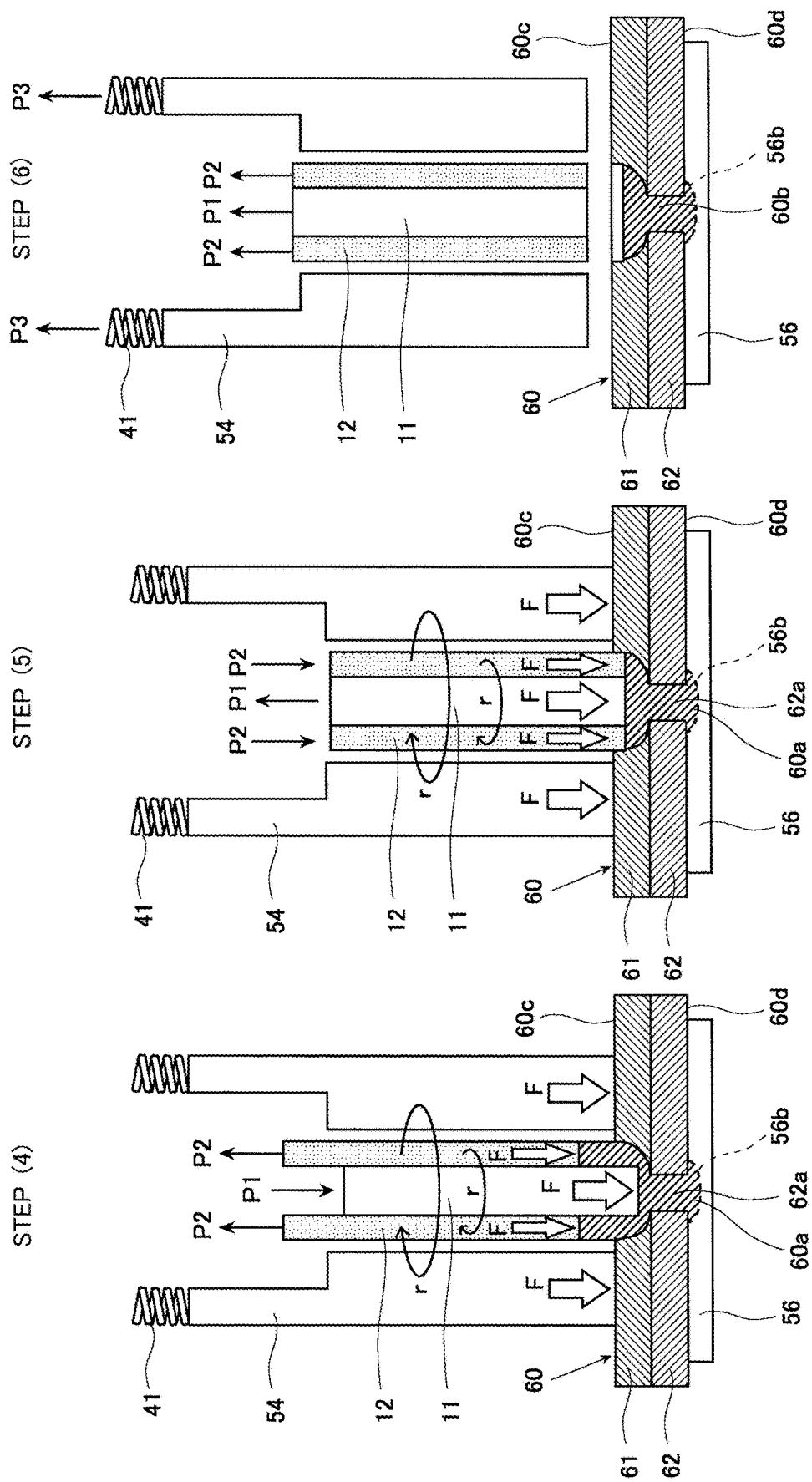
FIG. 7B is a process diagram schematically showing one example of steps of the friction stir spot welding performed by the friction stir spot welding apparatus shown in FIG. 5.

FIG. 6 is a flow chart showing one example of the operation of the friction stir spot welding apparatus according to this exemplary embodiment. FIGS. 7A and 7B are process diagrams showing one example of steps of the friction stir spot welding performed by the friction stir spot welding apparatus shown in FIG. 5.

FIGS. 7A and 7B show an example in which the plate-shaped first workpiece 61 and the plate-shaped second workpiece 62 are used as the welded workpiece 60, and these workpieces 61 and 62 are laminated on each other and coupled to each other by spot welding. The first workpiece 61 may be made of fiber reinforced plastic (for example, carbon fiber reinforced plastic). The second workpiece 62 may be made of metal (such as aluminum, steel, or titanium) or alloy (such as aluminum alloy).

Moreover, in this exemplary embodiment, the welded workpiece 60 is constituted by the plate-shaped first workpiece 61 and the plate-shaped second workpiece 62. However, the present embodiment is not limited to this, and the welded workpiece 60 (the first workpiece 61 and the second workpiece 62) may have any shape, and for example, may have a rectangular solid shape or a circular-arc shape.

Moreover, in FIGS. 7A and 7B, part of the double-acting friction welding apparatus is not shown. Arrows r indicate the rotational directions of the pin 11 and the shoulder 12, and block arrows F indicate directions of forces applied by the first workpiece 61 and the second workpiece 62.

Although forces are applied to the first workpiece 61 and the second workpiece 62 from the backing structure 56, such forces are not shown in FIGS. 7A and 7B for convenience of explanation. The shoulder 12 is shown by cross hatching to clearly distinguish between the pin 11 and the clamp structure 54.

First, a worker (operator) places the welded workpiece 60 on the supporting surface 56a of the backing structure 56. Next, the worker manipulates the inputter 32 to input execution of welding of the welded workpiece 60 to the controller 51. A robot may place the welded workpiece 60 on the supporting surface 56a of the backing structure 56.

Then, as shown in FIG. 6, the controller 51 drives the rotary driver 57 to rotate the pin 11 and the shoulder 12 at a preset and predetermined second rotational frequency (for example, 200 to 3,000 rpm) (Step S201; see Step (1) in FIG. 7A). Next, while driving the tool driver 53 (shoulder driver 532) to rotate the pin 11 and the shoulder 12, the controller 51 makes the pin 11, the shoulder 12, and the clamp structure 54 approach the welded workpiece 60 and brings the tip end surface 11a of the pin 11, the tip end surface 12a of the shoulder 12, and the tip end surface 54a of the clamp structure 54 into contact with the front surface 60c of the welded workpiece 60 (Step S202; see Step (2) in FIG. 7A).

At this time, the controller 51 controls the tool driver 53 (shoulder driver 532) such that the pin 11, the shoulder 12, and the clamp structure 54 press the welded workpiece 60 by a preset and predetermined second pressing force (for example, a predetermined value within a range of 3 kN to 10 kN).

With this, the first workpiece 61 and the second workpiece 62 are sandwiched by the clamp structure 54 and the backing structure 56, and the clamp structure 54 is biased toward the front surface 60c of the welded workpiece 60 by the contraction of the clamp driver 41 to generate clamping force.

Moreover, in this state, since the pin 11 and the shoulder 12 do not advance or retreat, the front surface 60c of the welded workpiece 60 is subjected to "preheating." With this, a constituent material at a contact region of the first workpiece 61A is softened by heat generated by friction, and thus, a plastically flowing portion 60a is generated in the vicinity of the front surface 60c of the welded workpiece 60.

Next, the controller 51 drives the tool driver 53 such that the tip end surface 11a of the pin 11 sinks relative to the tip end surface 12a of the shoulder 12 (Step S203). At this time, the controller 51 may drive the tool driver 53 (pin driver 531) such that the pin 11 separates from the welded workpiece 60. Moreover, the controller 51 may drive the tool driver 53 (pin driver 531) such that the shoulder 12 is pressed in the welded workpiece 60.

Moreover, the controller 51 controls the pin driver 531 such that the tip end portion of the shoulder 12 reaches a preset and predetermined second position.

The second position may be set in advance by experiments or the like. When the surface of the first workpiece 61 (the front surface 60c of the welded workpiece 60) is regarded as 0%, and a surface of the first workpiece 61 which surface contacts the second workpiece 62 is regarded as 100%, the second position is set arbitrarily within a range of more than 0% and less than 100%. To improve welding strength, the second position is preferably located close to the surface of the first workpiece 61 which surface contacts the second workpiece 62. The second position may be 25% or more, 50% or more, 75% or more, 80% or more, 90% or more, or 95% or more.

With this, a softened material of the plastically flowing portion 60a is pushed away by the shoulder 12 to flow from a position right under the shoulder 12 to a position right under the pin 11. Therefore, the pin 11 retreats and moves upward relative to the shoulder 12 (see Step (3) in FIG. 7A).

Next, the controller 51 drives the tool driver 53 (pin driver 531) such that the pin 11 advances toward the welded workpiece 60, or the controller 51 drives the tool driver 53 (pin driver 531) such that the shoulder 12 separates from the welded workpiece 60 (Step S204).

With this, the pin 11 gradually enters into (is gradually pressed in) the first workpiece 61, and the shoulder 12 retreats from the first workpiece 61 (see Step (4) in FIG. 7B). At this time, the softened part of the plastically flowing portion 60a flows from the position right under the pin 11 to the position right under the shoulder 12 (to a recess generated by press-in of the shoulder 12), is pushed away into the hole 62a of the second workpiece 62, and reaches the recess 56b of the backing structure 56.

In this exemplary embodiment, when executing Steps S203 and S204, the controller 51 controls the tool driver 53 so as to satisfy a formula "tool average position Tx=volume of recess 56b of backing structure 56/{radius of shoulder 12×radius of shoulder 12×π}" (Formula (1)). Moreover, the pressing force applied to the welded workpiece 60 from the pin 11 and the shoulder 12, the rotational frequencies of the pin 11 and the shoulder 12, and a drive time of the tool driver 53 are obtained in advance by experiments such that the tool average position Tx satisfies Formula (1). Then, the obtained pressing force and the like are stored in the storage 31.

Moreover, the controller 51 controls the tool driver 53 such that the pressing force applied to the welded workpiece 60 from the pin 11 and the shoulder 12 in Step S204 is smaller than that in Step S203 and/or controls the rotary driver 57 such that the rotational frequencies of the pin 11 and the shoulder 12 in Step S204 are lower than those in Step S203.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at the welded portion).

Furthermore, the controller 51 may change the movement speed of the pin 11 in accordance with the hardness of the fiber reinforced plastic located around the tip end portion of the pin 11. The movement speed of the pin 11 may be set in advance by experiments or the like.

The controller 51 may control the tool driver 53 such that the movement speed of the pin 11 in Step S204 is higher than that in Step S203. Moreover, the controller 51 may change the movement speed of the pin 11 based on a table, a graph, or the like which is stored in the storage 31 in advance and shows a correlation among the hardness of the fiber reinforced plastic located around the tip end portion of the pin 11, the rotational frequencies of the pin 11 and the shoulder 12 in Step S203, and the pressing force applied to the welded workpiece 60 from the pin 11 and the shoulder 12.

Next, the controller 51 controls the tool driver 53 such that the tip end surface 11a of the pin 11 and the tip end surface 12a of the shoulder 12 coincide with each other (Step S205). With this, the front surface 60c of the welded workpiece 60 is shaped (see Step (5) in FIG. 7B).

The controller 51 may control the rotary driver 57 such that the rotational frequencies of the pin 11 and the shoulder 12 in Step S205 are lower than those in Step S203. Moreover, the controller 51 may control the rotary driver 57 such that the rotational frequencies of the pin 11 and the shoulder 12 in Step S205 are lower than those in Step S204.

With this, the fiber reinforced plastic of which the welded workpiece 60 is made can be prevented from being excessively heated, and the resin of the fiber reinforced plastic can be prevented from excessively flowing (being excessively softened). Therefore, it is possible to prevent a case where the plastically flowing resin (softened resin) flows outward beyond the tip end surface 12a of the shoulder 12, and this deteriorates appearance quality (mainly the generation of recesses and burrs at the welded portion).

Moreover, the controller 51 may control the tool driver 53 such that the pressing force applied to the welded workpiece 60 from the pin 11 and the shoulder 12 in Step S205 is larger than that in Step S204. With this, voids (void defects) generated in the plastically flowing portion 60a of the welded workpiece 60 can be crushed, and the generation of the void defects in the welded workpiece 60 can be suppressed.

Next, the controller 51 controls the tool driver 53 (shoulder driver 532) such that the pin 11, the shoulder 12, and the clamp structure 54 separate from the welded workpiece 60 (Step S206). Next, the controller 51 controls the rotary driver 57 to stop the rotation of the pin 11 and the shoulder 12 (Step S207) and terminates the friction stir spot welding (step of welding the welded workpiece 60) (see Step (6) in FIG. 7B).

With this, since the rotation (and pressing) of the pin 11 and the shoulder 12 during the contact of the pin 11 and the shoulder 12 with the first workpiece 61 is not applied to the first workpiece 61, the plastic flow stops at the plastically flowing portion 60a, and the plastically flowing portion 60a becomes the welded portion 60b. With this, the first workpiece 61 and the second workpiece 62 are coupled (welded) to each other by the welded portion 60b.

The friction stir spot welding apparatus 50 according to this exemplary embodiment configured as above can obtain operational advantages similar to the operational advantages of the friction stir spot welding apparatus 50 according to the previous exemplary embodiment.

In the friction stir spot welding apparatus 50 according to this exemplary embodiment, the recess 56b is formed on the supporting surface 56a of the backing structure 56, and the hole 62a is formed on the second workpiece 62.

With this, the first workpiece 61 and the second workpiece 62 are welded to each other in such a manner that the plastically flowing portion 60a is pushed out to the hole 62a to reach the recess 56b. Therefore, even when the second workpiece 62 is made of a material (such as steel or titanium) that is difficult to be softened, the first workpiece 61 and the second workpiece 62 can be welded to each other.

Modified Example 1

Next, a modified example of the friction stir spot welding apparatus 50 according to this exemplary embodiment will be described with reference to FIG. 8.

Figure 8:
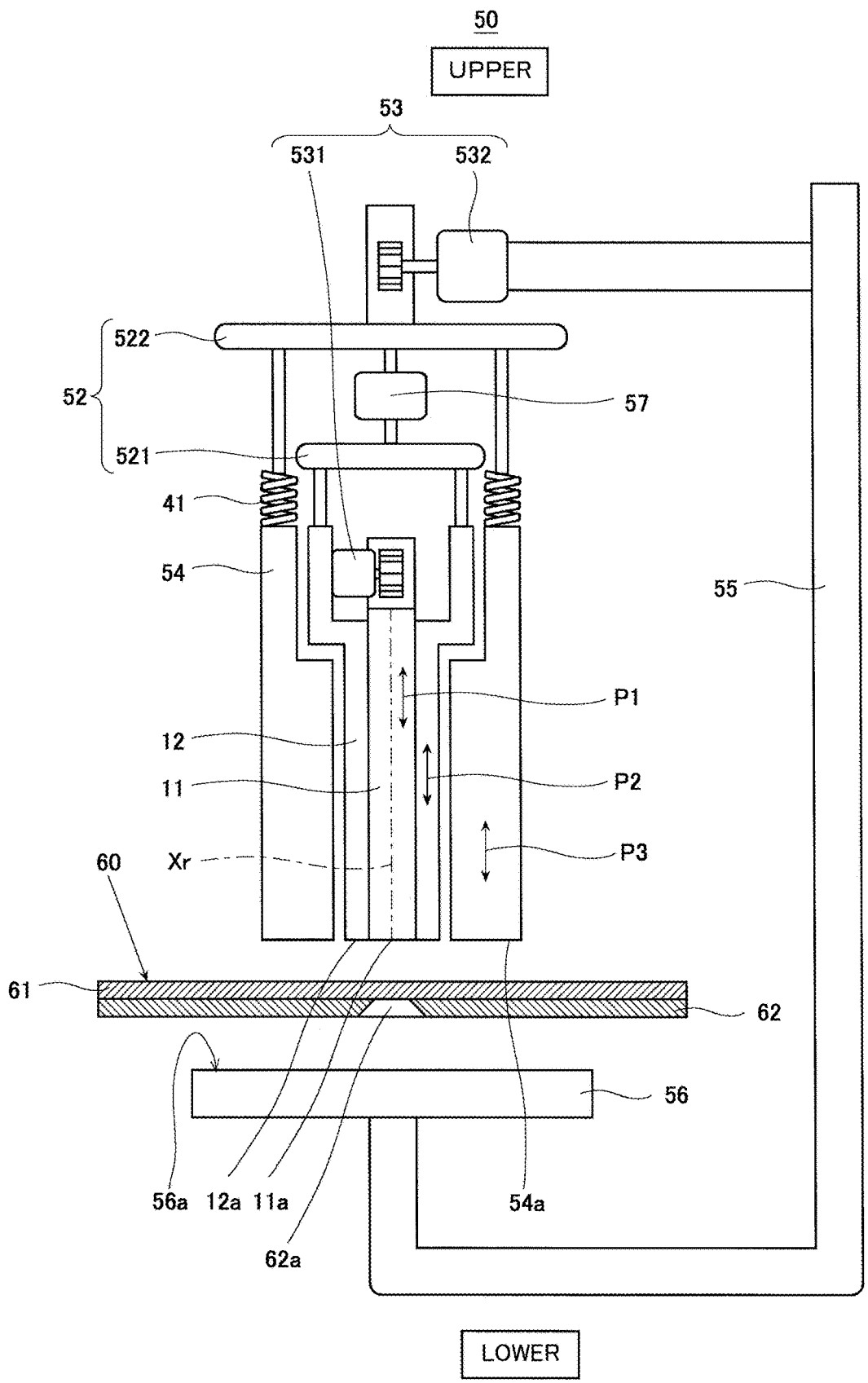
FIG. 8 is a schematic diagram showing a schematic configuration of the friction stir spot welding apparatus according to Modified Example 1 of an exemplary embodiment.

FIG. 8 is a schematic diagram showing a schematic configuration of the friction stir spot welding apparatus according to Modified Example 1 of this exemplary embodiment. An upper-lower direction in FIG. 8 corresponds to an upper-lower direction of the friction stir spot welding apparatus.

As shown in FIG. 8, the friction stir spot welding apparatus 50 according to Modified Example 1 is the same in basic configuration as the friction stir spot welding apparatus 50 according to this exemplary embodiment but is different from the friction stir spot welding apparatus 50 according to this exemplary embodiment regarding the shape of the hole 62a of the second workpiece 62 constituting the welded workpiece 60. Specifically, the hole 62a is formed such that an area of an opening of a surface of the second workpiece 62 which surface contacts the supporting surface 56a of the backing structure 56 is larger than an area of an opening of a surface of the second workpiece 62 which surface contacts the first workpiece 61.

With this, the welded portion 60b of the welded workpiece 60 can obtain an anchor effect. Therefore, in the friction stir spot welding apparatus 50 of Modified Example 1, the recess 56b does not have to be disposed on the supporting surface 56a of the backing structure 56.

The hole 62a may have any shape as long as the area of the opening of the surface of the second workpiece 62 which surface contacts the supporting surface 56a of the backing structure 56 is larger than the area of the opening of the surface of the second workpiece 62 which surface contacts the first workpiece 61. For example, the hole 62a may be formed such that the shape of a section thereof along a normal direction of a main surface of the second workpiece 62 is a tapered shape as shown in FIG. 8. Moreover, the hole 62a may be formed such that the shape of a section thereof along the normal direction of the main surface of the second workpiece 62 is a step shape.

The friction stir spot welding apparatus 50 according to Modified Example 1 configured as above has operational advantages similar to the friction stir spot welding apparatus 50 according to this exemplary embodiment.

From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure. In addition, various inventions can be made by suitable combinations of components disclosed in the above embodiments.

INDUSTRIAL APPLICABILITY

The friction stir spot welding apparatus and the friction stir spot welding method according to the present disclosure are useful to realize satisfactory welding quality of a welded workpiece including fiber reinforced plastic.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A method of operating a friction stir spot welding apparatus that partially stirs a workpiece including a first workpiece and a second workpiece to weld the first workpiece and the second workpiece to each other, the first workpiece including fiber reinforced plastic, the friction stir spot welding apparatus comprising:
a pin that is cylindrical or columnar, rotates about an axis, and advances or retreats in a direction along the axis;
a shoulder that is cylindrical, rotates about the axis, and advances or retreats in the direction along the axis, the pin being within the shoulder;
a rotary driver to rotate the pin and the shoulder about the axis; and
a tool driver to advance and retreat the pin and the shoulder along the axis,
the method comprising:
(A) operating the rotary driver and the tool driver such that the pin and the shoulder are brought into contact with the workpiece while rotating about the axis;
(B) operating, after the step (A), the rotary driver and the tool driver such that the pin moves in a direction away from the workpiece while the pin and the shoulder rotate about the axis, or such that the shoulder is further pressed in the workpiece while the pin and the shoulder rotate about the axis; and
(C) operating, after the step (B), the rotary driver and the tool driver such that the pin advances toward the workpiece while the pin and the shoulder rotate about the axis, or such that the shoulder moves in the direction away from the workpiece while the pin and the shoulder rotate about the axis,
wherein the tool driver operates such that rotational frequencies of the pin and the shoulder in the step (C) are lower than rotational frequencies of the pin and the shoulder in the step (B),
the method further comprising (D) operating, after the step (C), the rotary driver and the tool driver such that an end surface of the pin and an end surface of the shoulder are located on a front surface of the workpiece while the pin and the shoulder rotate about the axis,
wherein the rotary driver operates such that the rotational frequencies of the pin and the shoulder in the step (D) are lower than the rotational frequencies of the pin and the shoulder in the step (B) and the step (C).

2. The method according to claim 1, wherein the second workpiece includes fiber reinforced plastic.

3. The method according to claim 1, wherein:
the second workpiece includes metal and includes a hole; and
the tool driver operates so as to change a movement speed of the pin in the step (C) in accordance with hardness of the fiber reinforced plastic located around an end portion of the pin.

4. A method of operating a friction stir spot welding apparatus that partially stirs a workpiece including a first workpiece and a second workpiece to weld the first workpiece and the second workpiece to each other, the first workpiece including fiber reinforced plastic, the friction stir spot welding apparatus comprising:
a pin that is cylindrical or columnar, rotates about an axis, and advances or retreats in a direction along the axis;
a shoulder that is cylindrical, rotates about the axis, and advances or retreats in the direction along the axis, the pin being within the shoulder;
a rotary driver to rotate the pin and the shoulder about the axis; and
a tool driver to advance and retreat the pin and the shoulder along the axis,
the method comprising:
(A) operating the rotary driver and the tool driver such that the pin and the shoulder are brought into contact with the workpiece while rotating about the axis;
(B) operating, after the step (A), the rotary driver and the tool driver such that the pin moves in a direction away from the workpiece while the pin and the shoulder rotate about the axis, or such that the shoulder is further pressed in the workpiece while the pin and the shoulder rotate about the axis; and
(C) operating, after the step (B), the rotary driver and the tool driver such that the pin advances toward the workpiece while the pin and the shoulder rotate about the axis, or such that the shoulder moves in the direction away from the workpiece while the pin and the shoulder rotate about the axis,
wherein the tool driver operates such that rotational frequencies of the pin and the shoulder in the step (C) are lower than rotational frequencies of the pin and the shoulder in the step (B),
the method further comprising step (D) operating, after the step (C), the rotary driver and the tool driver such that an end surface of the pin and an end surface of the shoulder are located on a front surface of the welded workpiece while the pin and the shoulder rotate about the axis,
wherein the tool driver operates such that pressing force applied to the workpiece from the pin and the shoulder in the step (D) is larger than the pressing force applied to the workpiece from the pin and the shoulder in the step (C).

5. The method according to claim 4, wherein the second workpiece includes fiber reinforced plastic.

6. The method according to claim 4, wherein:
the second workpiece includes metal and includes a hole; and
the tool driver operates so as to change a movement speed of the pin in the step (C) in accordance with hardness of the fiber reinforced plastic located around an end portion of the pin.

* * * * *